(12) United States Patent
Knieper et al.

(10) Patent No.: US 12,479,411 B2
(45) Date of Patent: Nov. 25, 2025

(54) METHOD FOR OPERATING A VEHICLE BRAKE SYSTEM, AND VEHICLE BRAKE SYSTEM

(71) Applicants: ZF Active Safety GmbH, Koblenz (DE); ZF Active Safety US Inc., Livonia, MI (US)

(72) Inventors: Joerg Knieper, Vallendar (DE); Kraig Gerber, Plymouth, MI (US); Marco Becker, Oberduerenbach (DE); Peter Maeurer, Koblenz (DE); Paul Wecker, Limburg (DE)

(73) Assignees: ZF ACTIVE SAFETY GMBH, Koblenz (DE); ZF ACTIVE SAFETY US INC., Livonia, MI (US)

( * ) Notice: Subject to any disclaimer, the term of this patent is extended or adjusted under 35 U.S.C. 154(b) by 308 days.

(21) Appl. No.: 17/956,904

(22) Filed: Sep. 30, 2022

(65) Prior Publication Data
US 2024/0109528 A1    Apr. 4, 2024

(51) Int. Cl.
*B60T 17/22* (2006.01)
*B60T 13/66* (2006.01)

(52) U.S. Cl.
CPC .......... *B60T 17/221* (2013.01); *B60T 13/662* (2013.01); *B60T 2270/406* (2013.01); *B60T 2270/88* (2013.01); *B60T 2270/89* (2013.01)

(58) Field of Classification Search
CPC .. B60T 13/662; B60T 17/221; B60T 2270/88; B60T 2270/89
See application file for complete search history.

(56) References Cited

U.S. PATENT DOCUMENTS

| | | | |
|---|---|---|---|
| 8,746,809 B2* | 6/2014 | Tachiiri | B60T 13/588 303/15 |
| 9,327,702 B2* | 5/2016 | Suzuki | F16D 65/183 |

* cited by examiner

*Primary Examiner* — Phutthiwat Wongwian
*Assistant Examiner* — Mark L. Greene
(74) *Attorney, Agent, or Firm* — Tarolli, Sundheim, Covell & Tummino LLP (57) ABSTRACT

The invention relates to a method for operating a vehicle brake system and to a vehicle brake system, wherein the vehicle brake system comprises at least one hydraulic vehicle brake (10), having a brake caliper (12), having a brake piston (16), having a brake piston seal (20) which is assigned to the brake caliper (12) and which acts between the brake caliper (12) and brake piston (16), having brake pads (22), and having a brake disk (24), in which method a hydraulic brake pressure acting on the brake piston (16) is built up in a manner dependent on a braking command. The brake pressure is furthermore held in a manner dependent on the braking command. If the braking command is withdrawn, the hydraulic brake pressure acting on the brake piston (16) is reduced to a hydraulic intermediate pressure, and the hydraulic intermediate pressure is held for a defined second period of time. The hydraulic brake pressure is subsequently reduced.

16 Claims, 6 Drawing Sheets

METHOD FOR OPERATING A VEHICLE BRAKE SYSTEM, AND VEHICLE BRAKE SYSTEM

TECHNICAL FIELD

The invention relates to a method for operating a vehicle brake system and to a vehicle brake system that comprises a hydraulic vehicle brake, having a brake caliper, having a brake piston, having a receiving bore for the brake piston, and having a brake piston seal that acts between the brake caliper and the brake piston.

BACKGROUND

Such brake piston seals are commonly composed of elastomer material and are accommodated in a groove in the wall that defines the receiving bore. When the brake is actuated, the brake piston then moves relative to the brake piston seal, which is deformed within the groove owing to the friction between the seal and the brake piston. If the travel of the brake piston is greater than the travel that can be compensated exclusively by deformation of the brake piston seal, sliding of the brake piston along the brake piston seal occurs. If the braking operation is ended, the pressure in the chamber adjoining the brake piston falls abruptly, and it is the intention that the brake piston moves as quickly as possible back into the original position, that is to say into a position remote from the brake disk, in order to attain the optimum air gap. Here, by virtue of the fact that it seeks to move back into its non-deformed initial position, the deformed brake piston seal can assist this resetting operation of the brake piston.

SUMMARY

It is an object of the invention to further improve this resetting effect that can be achieved by way of the brake piston seal, in order to prevent grinding of the brake pads against the brake disk and associated tractive resistance and grinding noises.

The object is achieved according to the invention by way of a method for operating a brake system, wherein the vehicle brake system comprises at least one hydraulic vehicle brake, having a brake caliper, having a brake piston, having a brake piston seal which is assigned to the brake caliper and which acts between the brake caliper and brake piston, having brake pads, and having a brake disk, characterized by the following method steps:

a) building up a hydraulic brake pressure, which acts on the brake piston, in a manner dependent on a braking command, and generating a clamping force between the brake disk and the brake pads;
b) holding the brake pressure in a manner dependent on the braking command;
c) upon withdrawal of the braking command, reducing the hydraulic brake pressure acting on the brake piston to a hydraulic intermediate pressure;
d) holding the hydraulic intermediate pressure or the intermediate state of strain for a defined second period of time; and
e) reducing the hydraulic brake pressure.

The reduction of the hydraulic pressure acting on the brake piston and the holding of the hydraulic brake pressure in steps a) and b) are associated with deformations of the brake caliper and of the brake pads. Furthermore, the brake piston seal lying against the brake piston is deformed toward the brake disk as a result of the displacement of the brake piston toward the brake disk and the static or sliding friction that acts here between the brake piston seal and the brake piston. This deformation is additionally caused by the hydraulic brake pressure acting on the brake piston seal during the braking operation.

By way of the reduction of the hydraulic brake pressure acting on the brake piston to a hydraulic intermediate pressure after the withdrawal of the braking command in step c), it is the underlying concept of the invention to initially allow only a relaxation of the brake caliper and, in part, of the brake pads. Thus, by way of the hydraulic intermediate pressure acting on the brake piston seal, it is ensured that the brake piston seal remains in a state of deformation that is practically unchanged in relation to that which was present owing to the original movement of the brake piston toward the brake disk. Consequently, when the hydraulic brake pressure is lowered at least approximately to the hydraulic intermediate pressure, the brake piston seal remains deformed and undergoes no or only minimal relaxation.

The relaxation of the brake caliper and of the brake pads is also associated with a movement of the brake piston away from the brake disk. This results in sliding friction at the contact faces between the brake piston and the brake piston seal in the event of relative movements of the brake piston, whilst the brake piston seal, owing to the prevailing intermediate pressure, remains deformed to at least approximately the same extent and does not adhere to the brake piston (which would have the result that the brake piston seal would assume an undesired state of deformation that would follow the direction of movement of the brake piston).

Consequently, during the relative movement of the brake piston and of the brake caliper, the force prevailing as a result of the intermediate pressure, which force acts on the brake piston seal, exceeds the force acting between the brake piston seal and brake piston owing to sliding friction.

Furthermore, the hydraulic intermediate pressure is selected such that the braking force that is generated by the brake pads that are forced against the brake disk by the intermediate pressure is negligibly low.

Within the second period of time, whilst the hydraulic intermediate pressure is held, the deformation of the brake piston seal is thus maintained. At the same time, further relaxation processes take place in the brake caliper and/or the brake pads.

The subsequent reduction of the hydraulic brake pressure is associated with an at least approximately complete relaxation of the brake caliper, of the brake pads and in particular of the brake piston seal, wherein, owing to the static friction acting between the brake piston seal and the brake piston, the relaxation of the brake piston seal results in a movement of the brake piston away from the brake disk, such that the brake pads have a sufficient air gap with respect to the brake disk.

According to one aspect of the invention, in step c), the hydraulic brake pressure may be decreased within a predefined first period of time to a set hydraulic intermediate pressure, and the clamping force between the brake disk and the brake pads thus decreased, and/or, in step c), said hydraulic brake pressure may be decreased in a manner dependent on a state of strain, detected by sensor means, of at least one part of the hydraulic vehicle brake, until said at least one part exhibits a set intermediate state of strain, and the clamping force between the brake disk and the brake pads is thus decreased.

If the hydraulic brake pressure is decreased within a predefined first period of time to a set hydraulic intermediate pressure, then an abrupt pressure drop of the hydraulic brake pressure can be prevented, whereby it is ensured that the brake pressure acting on the brake piston seal is sufficient to maintain the deformation of the brake piston seal that has been assumed during the braking operation. Only a relaxation of the brake caliper and of the brake pads is allowed, and at the same time a negligible braking force is caused by the low clamping force.

If the hydraulic pressure is reduced in a manner dependent on a state of strain, detected by sensor means, of the hydraulic vehicle brake until this exhibits a set intermediate state of strain, then an intermediate state of strain is selected in the case of which the original deformation of the brake piston seal, resulting from the adjustment of the brake piston toward the brake disk which takes place during the braking operation, is maintained, and in the case of which only a relaxation of brake caliper and brake pads takes place. Furthermore, the clamping force is also reduced such that only a negligible braking force arises.

The reduction of the hydraulic brake pressure acting on the brake piston in step c) may take place linearly within the first time window. The uniform pressure drop is advantageous for maintaining the state of deformation of the brake piston seal in step c) despite the falling pressure and a brake piston which, under some circumstances, is moving away from the brake disk.

In steps c) and d), the set hydraulic intermediate pressure may be selected such that the force exerted on the brake piston by the intermediate pressure is greater than a resetting force which is present during step c) and d) and which is imparted to the brake piston by the deformation of the brake piston seal that is generated in step b).

It is thus ensured that the brake piston is initially reset by the relaxing brake caliper and the brake pads, and the resetting by way of the brake piston seal first takes place in a controlled manner in the subsequent steps.

In steps c) and d), the set hydraulic intermediate pressure may advantageously be at least 1 bar and at most 3 bar.

This magnitude has proven to be particularly advantageous for the hydraulic intermediate pressure, because with this a practically complete relaxation of the brake caliper and of the brake pads is achieved. The clamping forces that prevail here between the brake pads and the brake disk are negligibly low, such that the braking action caused by the hydraulic intermediate pressure after withdrawal of the braking command is also negligible. Furthermore, owing to the hydraulic intermediate pressure acting on the brake piston seal, the deformation of the brake piston seal that the latter has assumed during the braking operation is at least approximately maintained.

Preferably, for the set intermediate state of strain, the state of strain of the brake caliper and/or of the brake pads and/or of the brake piston seal is considered.

If the state of strain of the brake caliper is considered, this allows particularly straightforward installation of sensors for measuring the state of strain. Furthermore, the sensors may be attached to the brake caliper such that they are cooled by the relative wind and do not overheat.

If the state of strain of the brake pads is detected, then it is also possible in this way for the state of wear of the brakes, and thus also the changing deformation behaviour of the brake pads that is dependent on the state of wear, to be considered.

If it is the intention for the state of strain of the brake piston seal to be considered, then particularly exact setting of the hydraulic brake pressure is possible in this way. Specifically, through the detection of the state of strain of the brake piston seal, the deformation of the seal during the braking operation is known, such that the reduction of the hydraulic brake pressure in step c) and the associated change in the state of strain of the brake piston seal can be utilized in order to end the reduction of the hydraulic brake pressure.

Preferably, in step c), the first period of time in which the hydraulic pressure is reduced to the set hydraulic intermediate pressure may lie in the interval from 1 second to 30 seconds, in particular from 5 seconds to 20 seconds.

This interval has proven to be particularly advantageous in order to achieve a relaxation of brake caliper and brake pads and at the same time ensure, by way of the brake pressure drop over an interval of 1 second to 30 seconds, in particular 5 seconds to 20 seconds, that the brake piston seal at least approximately maintains its original deformation.

The maximum and/or the average hydraulic brake pressure during the braking operation may advantageously be detected before step c). Steps c) to e) may be carried out only if a minimum brake pressure is overshot, wherein the minimum brake pressure is in particular higher than 30 bar, preferably higher than 40 bar.

If the minimum pressure is not reached or overshot, then a direct reduction of the hydraulic brake pressure takes place after the withdrawal of the braking command, without steps c) to e) being carried out.

Below certain brake pressures, only static friction is present between the brake piston seal and the brake piston in the contact region. This has the result that the brake piston does not slide along on the brake piston seal, and the relative position of the contact region between brake piston seal and brake piston thus also does not change, because no sliding friction is present. During these braking operations, the brake piston seal is deformed owing to the static friction, and lies permanently against the same point on the brake piston without sliding. If the braking command is withdrawn, a reduction of the hydraulic brake pressure occurs, and the seal deforms back into its original state. Here, it is likewise the case that static friction prevails between the brake piston and the brake piston seal, such that this automatically resets the brake piston back into the initial situation prior to the braking operation, which eliminates the need for additional resetting of the brake piston.

Above the minimum pressures, there is initially static friction between brake piston and brake piston seal during the movement of the brake piston. This however changes to sliding friction as soon as the pressure rises such a level that a relative movement between brake piston seal and brake piston occurs. Here, by means of the method, the brake piston can additionally be reset.

Step d) may advantageously be associated with a deformation of the brake pads, of the brake caliper and of the brake piston seal in a direction of movement of the brake piston. In step c), the reduction of the hydraulic brake pressure may be such that only a reversal of the deformation of the brake caliper and of the brake pads by at least 90% occurs, whilst the brake piston seal continues to exhibit a deformed state in the direction of the original movement direction of the brake piston owing to the continuously present intermediate pressure, and maintains this for as long as the intermediate pressure prevails.

The reversal of the deformation of the brake caliper and of the brake pads by at least 90% is also associated with a movement of the brake piston away from the brake disk into the brake caliper, such that the brake piston already moves toward its initial position and a further resetting can be realized in and after step e) by way of the previously still-deformed brake piston seals.

Preferably, in step e), a reduction of the hydraulic pressure acting on the brake piston may take place within a defined third period of time.

The third period of time makes it possible for the relaxation processes within the brake piston seal to take place slowly. The seal does not deform abruptly back into the initial state, whereby no sliding friction between the brake piston seal and the brake piston occurs in the contact region. This would have the result of the brake piston not being fully reset. Instead, static friction is maintained, such that, with the reversal of the deformation of the brake piston seal, the brake piston is moved away from the brake disk.

Preferably, within the third period of time, a hydraulic alternating pressure may be built up and reduced, wherein the magnitude of the maximum alternating pressure is less than that of the intermediate pressure. Here, it is for example conceivable that, within a short time window of less than 10 seconds, the pressure is alternately built up from 0 bar up to 1 to 2 bar and reduced again, which is advantageous for the relaxation process.

Steps c) to e) may be terminated if a new braking command is imparted or identified during the steps. Here, the method may begin again with step a). It is thus ensured that, every time a braking operation is initiated, this is also executed, and the method begins again.

The invention finally relates to a hydraulic vehicle brake system, which comprises at least one hydraulic vehicle brake, having a brake caliper, having a brake piston, having a brake piston seal which is assigned to the brake caliper and which acts between the brake caliper and brake piston, having brake pads, and having a brake disk and having a controller that is configured to carry out the method according to the invention.

BRIEF DESCRIPTION OF THE DRAWINGS

The invention will be described below on the basis of an embodiment that is illustrated in the appended drawings. In the drawings.

DESCRIPTION

Figure 1:
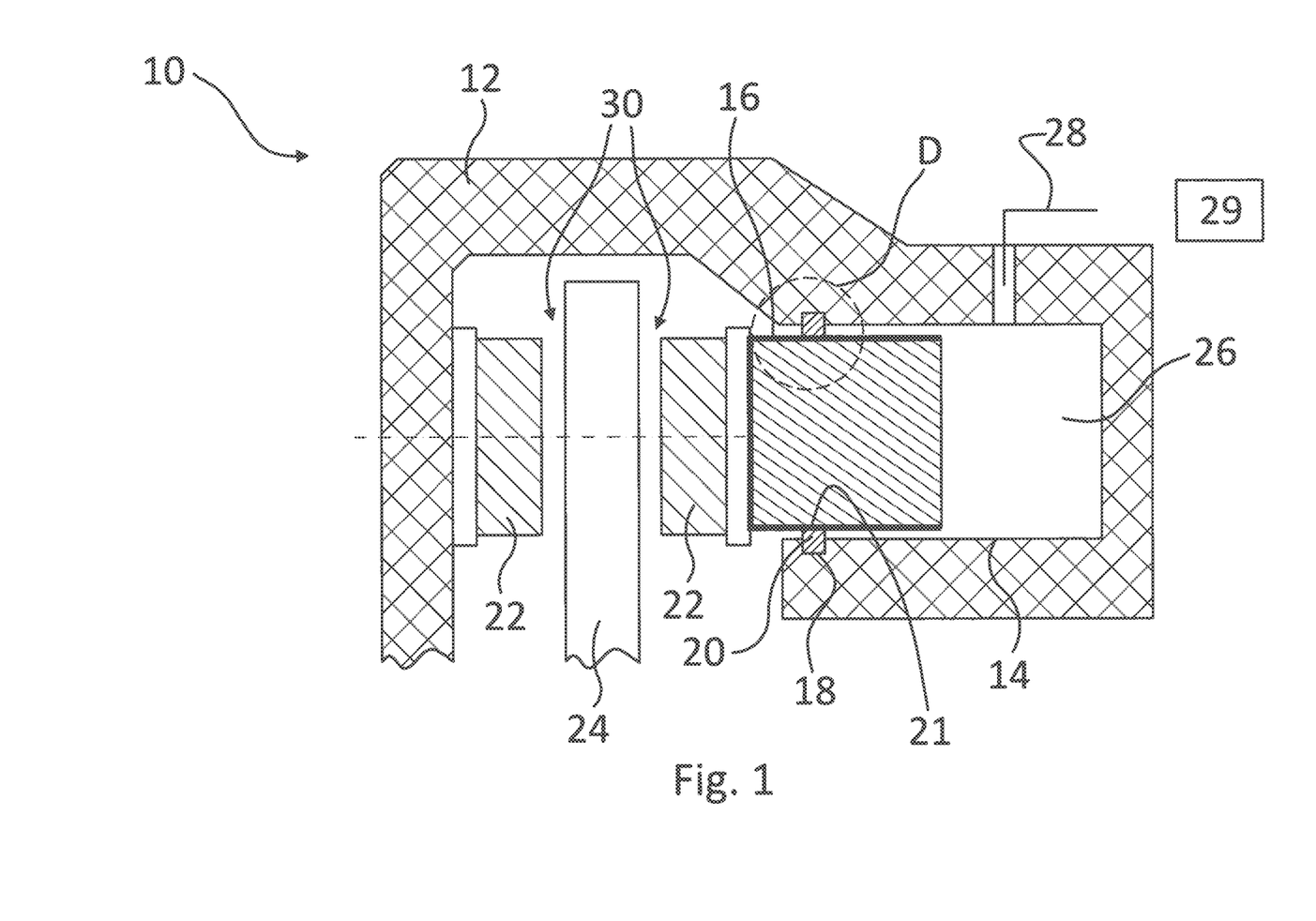
FIG. 1 shows a schematic cross-sectional view through a part of a hydraulic vehicle brake system according to the invention.

FIG. 1 shows a hydraulic vehicle brake 10 of a vehicle brake system in a non-braking initial state. The hydraulic vehicle brake 10 comprises a brake caliper 12 with a bore 14 in which a linearly movable brake piston 16 is received. A groove 18 with a brake piston seal 20 is provided in the bore 14.

The brake piston seal 20 acts between the bore 14 of the brake caliper 12 and the brake piston 16.

The hydraulic vehicle brake 10 furthermore comprises brake pads 22 that are arranged opposite one another and along a direction of movement R of the brake piston 16. A brake disk 24 is positioned between the brake pads 22.

Furthermore, the brake piston 16 and the bore 14 of the brake caliper form a chamber 26 in which a hydraulic brake pressure can be applied via a brake line 28. A controller 29 for the hydraulic system can control the following braking states.

FIG. 1 shows a state in which the brake pads 22 are spaced apart from the brake disk 24, such that an air gap 30 is present to both sides between the brake disk 24 and the respective brake pad 22. It is consequently also the case that no clamping force is being imparted that would result in a braking force, such that FIG. 1 shows a state in which no braking is being performed.

The method for operating the vehicle brake system will be discussed below proceeding from FIG. 1 and additionally on the basis of FIGS. 2 to 5.

Figure 5:
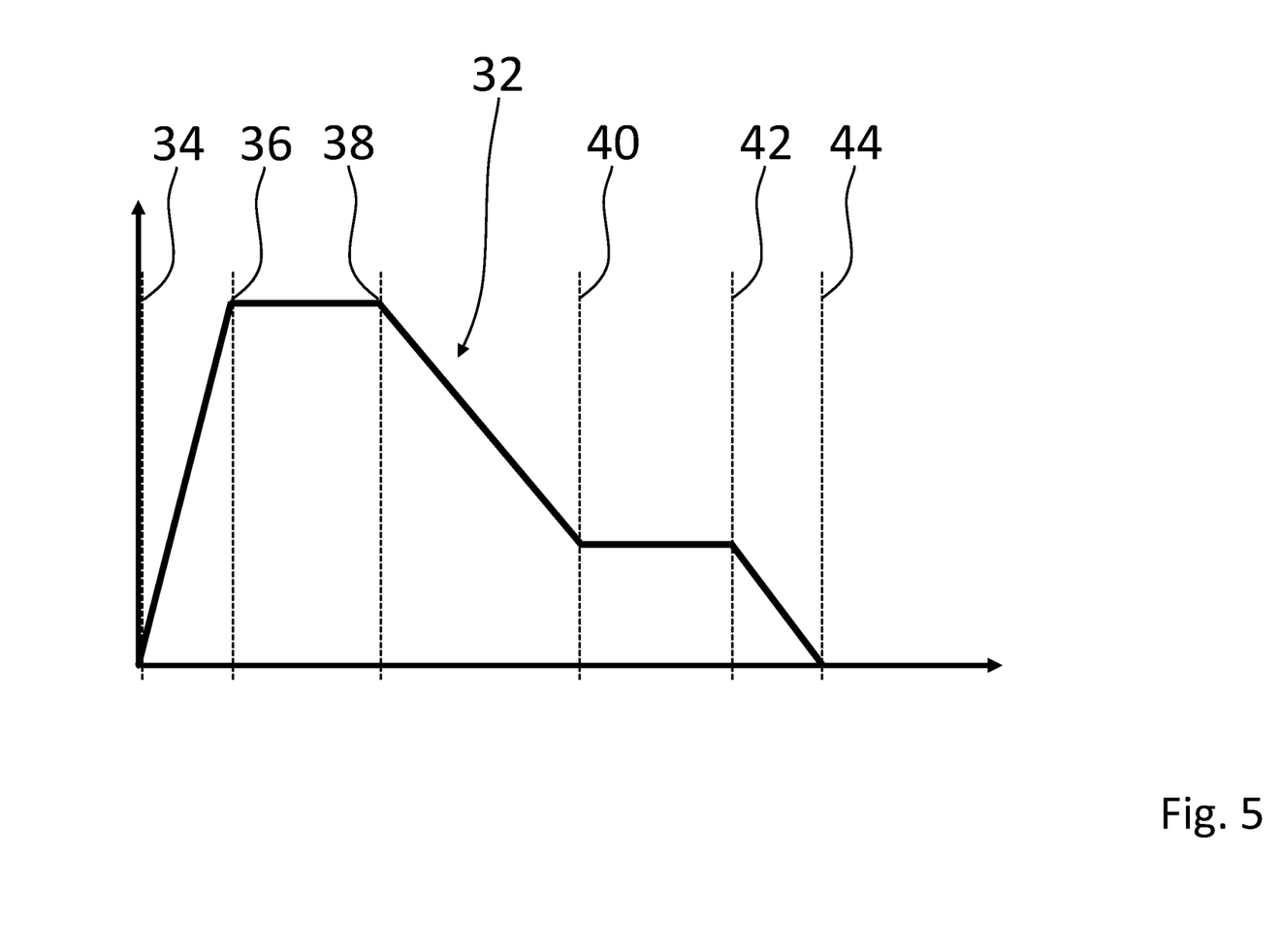
FIG. 5 shows a diagram with a graphical illustration of the hydraulic brake pressure versus the time during the method according to the invention.

FIG. 5 shows a diagram with a curve 32 of the hydraulic brake pressure, which acts on the brake piston 16 during one complete braking operation, versus the time. The dashed lines shown in the diagram represent various points in time during the operation of the vehicle brake system and serve for reference during the further explanations.

As already mentioned in the above explanations, FIG. 1 shows the hydraulic vehicle brake 10 of the vehicle brake system in a non-braking initial state. It is consequently also the case that no hydraulic brake pressure is prevailing (see FIG. 5, position 34).

If a braking command is imparted or detected, an increase of the hydraulic brake pressure in the chamber 26 occurs via the brake line 28. The build-up of the hydraulic brake pressure versus the time and the maximum magnitude of the hydraulic brake pressure during the braking operation are dependent here on the imparted braking command (see FIG. 5, section between positions 34 and 36).

The build-up of the brake pressure is associated with a movement of the brake piston from the initial position A toward the brake disk 24 as far as the braking position B (see FIG. 2, movement direction R), such that a clamping force is generated between the brake disk 24 and the brake pads 22, which generates a braking force.

Figure 2:
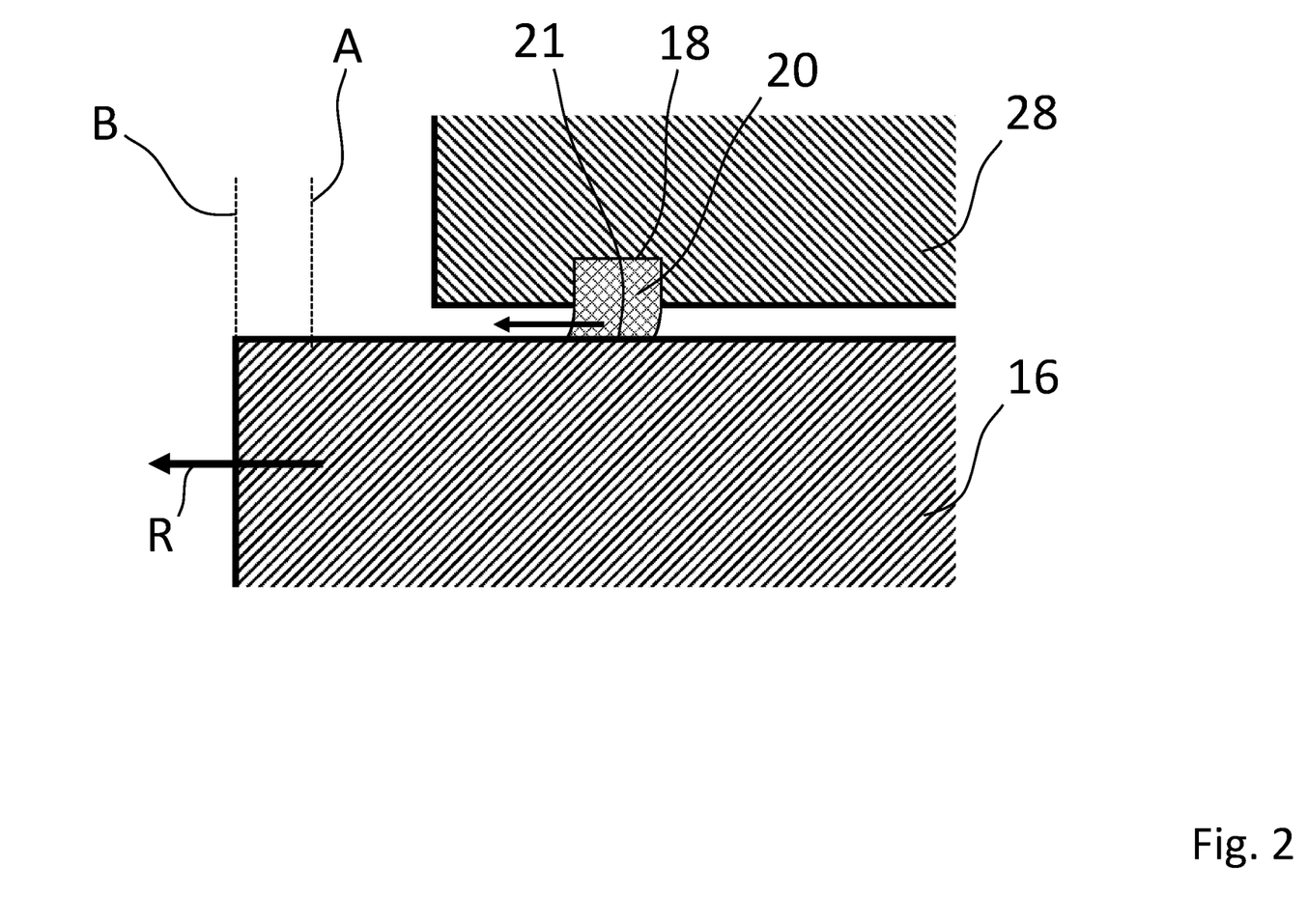
FIG. 2 shows a part of the hydraulic vehicle brake system that is situated within the portion D marked in FIG. 1, with a brake piston in a braking position.

Owing to the brake piston 16 moving in the direction of the brake disk 24, the static friction in a contact region 21 between the brake piston seal 20 and the brake piston 16 results in a deformation of the brake piston seal 20 in the direction of the direction of movement of the brake piston 16 (see FIG. 2). If the brake piston 16 moves relative to the brake piston seal 20 to such an extent that the static friction changes to sliding friction, then the relative position of the contact region 21 on the brake piston 16 changes, wherein the deformation of the brake piston seal 20 in a direction of movement of the brake piston 16 is maintained.

Furthermore, deformation of the brake pads 22 and of the brake caliper 12 also occur during the braking operation.

To reach the braking position B, the air gap 30 between the brake disk 24 and the brake pads 22 must be overcome until the brake pads 22 bear against the brake disk 24 and generate a clamping force and thus also a braking force.

Owing to the deformation of the brake pads 22 and of the brake caliper 12, the brake piston must cover a greater travel than would be necessary to merely overcome the air gap.

When the desired hydraulic brake pressure has been attained, this is held in a manner dependent on the braking command (see FIG. 5, section between position 36 and position 38). Here, the hydraulic pressure need not be constant, as shown in the diagram in FIG. 5, but rather may vary, and increase or decrease in magnitude, in the event of variation of the braking command during the braking operation.

If the braking command is withdrawn (see FIG. 5, position 38), then the hydraulic brake pressure acting on the brake piston is reduced to a hydraulic intermediate pressure. Here, the profile of the hydraulic brake pressure during the reduction within the first time window is linear (see FIG. 5, position 40).

Here, the reduction of the hydraulic brake pressure acting on the brake piston 16 takes place within a predefined time window (see FIG. 5, section between position 38 and position 40). Since the hydraulic intermediate pressure is lower in magnitude than the hydraulic brake pressure during the braking operation, the clamping force between the brake disk 24 and the brake pads 22 also decreases, such that the acting braking force is also decreased.

Here, the first predefined period of time may be 1 second to 30 seconds, in particular 5 seconds to 20 seconds.

The set hydraulic intermediate pressure is at least 1 bar and at most 3 bar.

The reduced clamping force that is present between the brake disk 24 and the brake pads 22 in the presence of the hydraulic intermediate pressure acting on the brake piston 16 is selected such that the driver does not notice any perceptible deceleration.

Alternatively, the hydraulic brake pressure may also be decreased in a manner dependent on a state of strain, detected by sensor means, of at least one part of the hydraulic vehicle brake 10 until a set intermediate state of strain of the at least one part of the hydraulic vehicle brake 10 has been attained. When the specified intermediate state of strain has been attained, it is also the case that a hydraulic intermediate pressure prevails, the magnitude of which is lower than the hydraulic brake pressure during the braking operation. Consequently, it is also the case in this variant that the clamping force between the brake disk 24 and the brake pads 22 is greatly reduced.

Here, for the set intermediate state of strain, the state of strain of the brake caliper 12 and/or of the brake pads 22 and/or of the brake piston seal 20 may be considered.

Here, too, the intermediate state of strain may advantageously be hold over a predefined period of time of 1 second to 30 seconds, in particular 5 seconds to 20 seconds.

Figure 3:
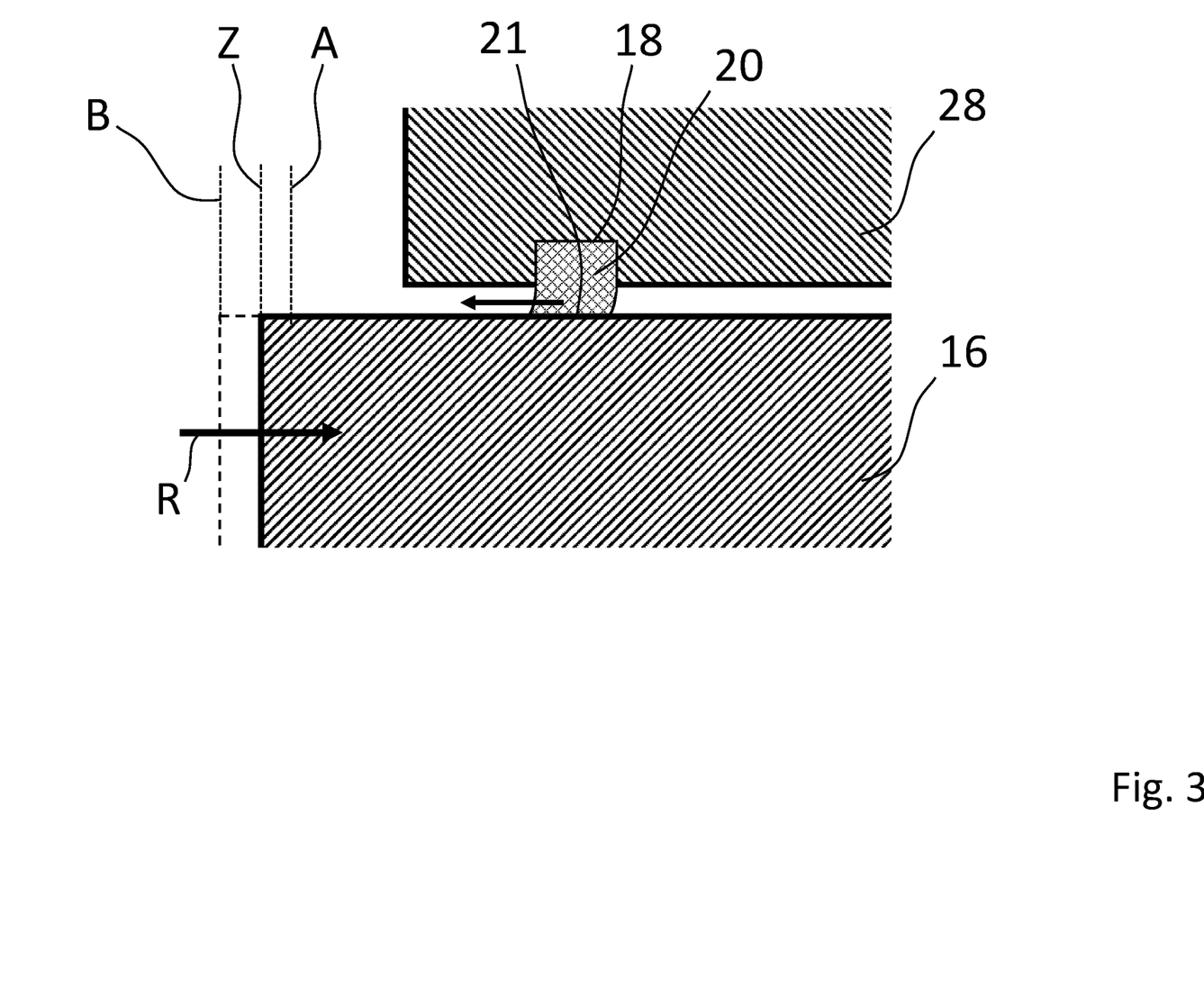
FIG. 3 shows the part of the hydraulic vehicle brake system that is situated within the portion D marked in FIG. 1, with a brake piston in an intermediate position.

As a result of the reduction of the hydraulic brake pressure to a hydraulic intermediate pressure, or as a result of the reduction of the hydraulic brake pressure in a manner dependent on the state of strain, detected by sensor means, of the at least one part of the hydraulic vehicle brake to a set intermediate state of strain, the deformation of the brake caliper 12 and that of the brake pads 22 decrease (see FIG. 3).

This has the result that the brake piston 16 moves away from the brake disk 24 into the bore 14 and thus assumes an intermediate position Z. The reversal of the deformation of the brake caliper 12 and of the brake pads 22 amounts here to at least 90%.

Owing to the continuously present intermediate pressure, the brake piston seal 20 maintains the deformed state in the direction of the original direction of movement of the brake piston 16 toward the brake disk 24. Consequently, the force exerted on the brake piston seal 20 by the intermediate pressure is higher than the force that is present in the contact region 21 owing to the sliding friction between the brake piston seal 20 and the brake piston 16, such that the position of the contact region 21 on the brake piston 16 is displaced (see FIG. 4).

In the next step, the hydraulic intermediate pressure or the intermediate state of strain is held for a defined second period of time (see FIG. 5, section between position 40 and position 42). The defined second period of time may last for 5 seconds to 20 seconds. During this time, further relaxation processes take place in the brake caliper 12 and the brake pads 22, such that the deformation thereof decreases further, whilst the brake piston seal 20 continuously exhibits a deformed state.

Finally, the hydraulic brake pressure is at least approximately completely depleted (see FIG. 5, position 44). As a result, the deformation of the brake caliper 12 and that of the brake pads 22 are fully diminished. Furthermore, the deformation of the brake piston seal 20 also decreases, such that this assumes its original shape (see FIG. 4).

Figure 4:
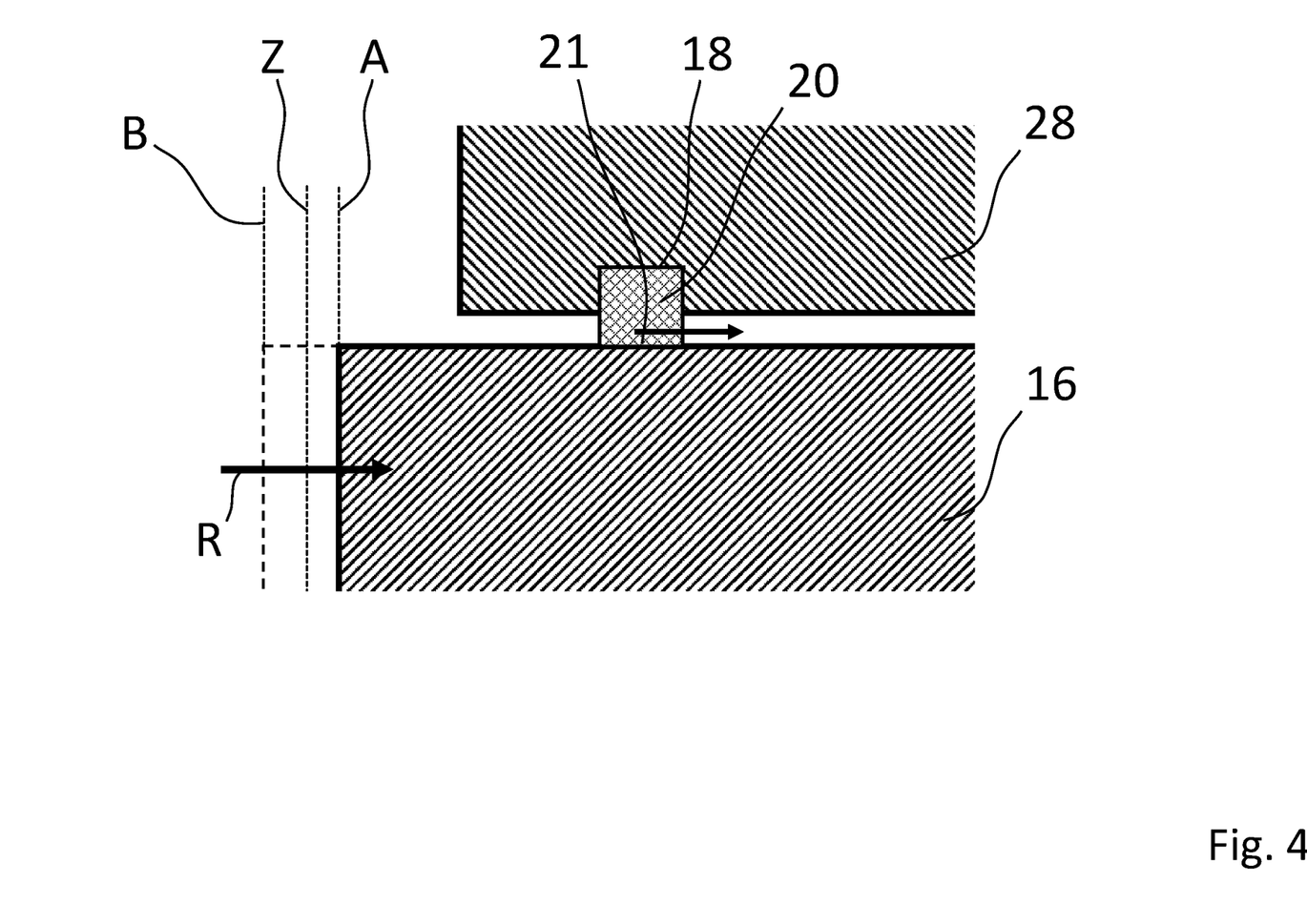
FIG. 4 shows the part of the hydraulic vehicle brake system that is situated within the portion D marked in FIG. 1, with a brake piston in an initial position.

Owing to the brake piston seal 20 that deforms back into the original state, the brake piston 16 experiences a resetting force owing to the static friction in the contact region 21 between the brake piston seal 20 and the brake piston 16, such that the brake piston 16 is reset and moves away from the brake disk 24 into the bore 14. Here, the brake piston 16 at least approximately reaches the initial position A.

The reduction of the hydraulic intermediate pressure acting on the brake piston may in this case take place within a defined third time window (see FIG. 5, section between positions 42 and 44) and not abruptly, such that, during the reversal of the deformation, the brake piston seal 20 does not slide over the brake piston 16 in the contact region 21 but builds up static friction in the contact region 21, resulting in a resetting force and thus a resetting displacement of the brake piston 16 into the initial position A.

It is furthermore conceivable that, before the hydraulic brake pressure acting on the brake piston 16 is reduced, the maximum and/or average brake pressure during the braking operation is detected, and the subsequent steps are carried out only if a minimum brake pressure is overshot during the braking operation.

If, for example, a minimum brake pressure of 30 bar, preferably a minimum brake pressure of 40 bar, has not been overshot, the brake piston 16 experiences only a small displacement toward the brake disk 24. Exclusively static friction prevails in the contact region 21 between the brake piston seal 20 and the brake piston 16. The contact region 21 is not displaced along the brake piston 16, such that the resetting by way of the brake piston seal 20 is sufficient to move the brake piston and thus the brake pads 22 away from the brake disk 24 as soon as the braking operation has ended.

If a new braking command is imparted or identified during the method, the method step being performed is terminated, and the method begins again.

Figure 6:
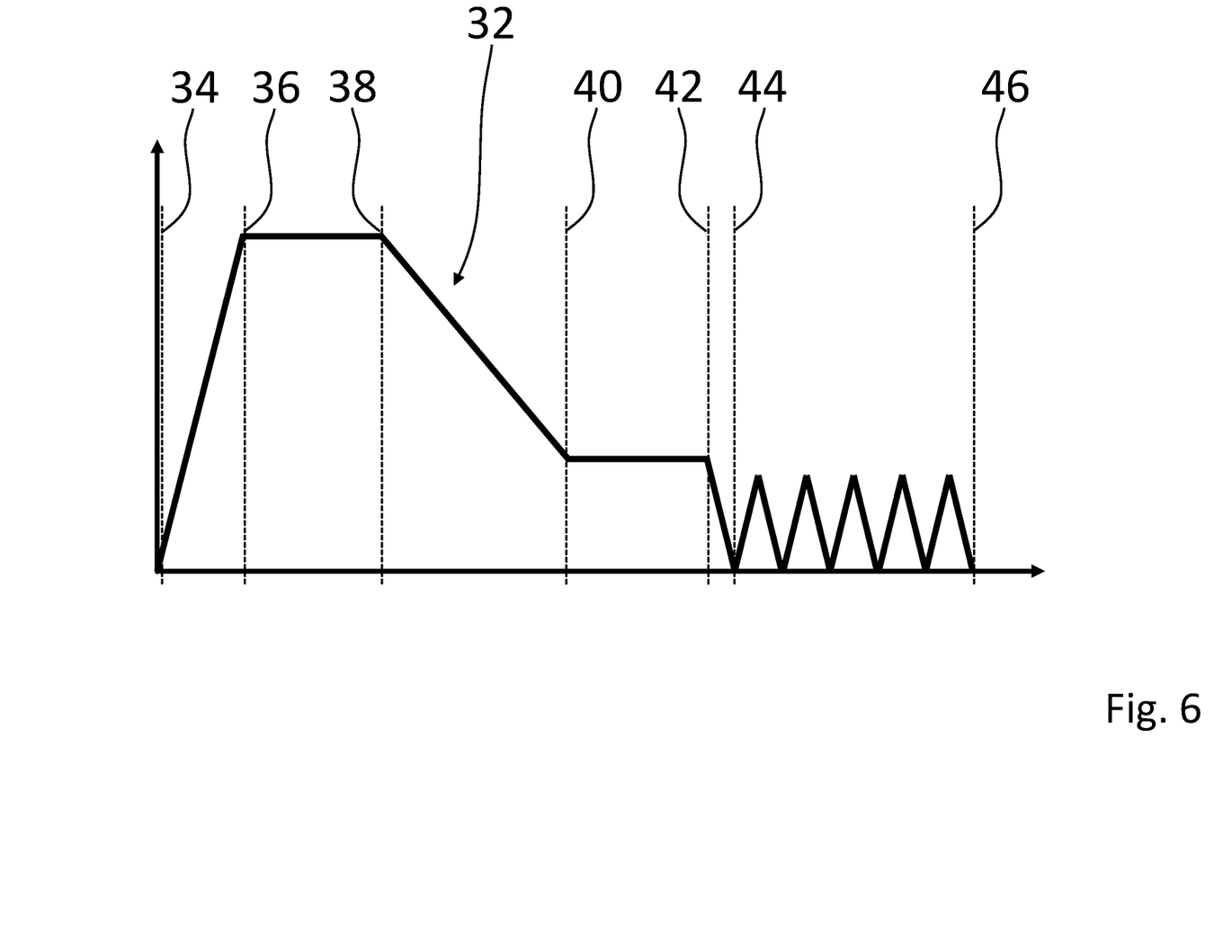
FIG. 6 shows a diagram with a graphical illustration of the hydraulic brake pressure versus the time during the method according to the invention according to a further variant.

FIG. 6 shows a diagram of the operation of the vehicle brake system according to a variant. In this variant, within the third time window, hydraulic brake pressure is alternately built up from 0 to 1-2 bar, and reduced again, up to 5 times. The magnitude of the maximum alternating pressure is less than that of the intermediate pressure. This pumping contributes the brake piston being fully moved back by way of the relaxing brake piston seal (see FIG. 6, section between position 44 and position 46).

The invention claimed is:

1. A method for operating a vehicle brake system, wherein the vehicle brake system comprises at least one hydraulic vehicle brake (10), having a brake caliper (12), having a brake piston (16), having a brake piston seal (20) which is assigned to the brake caliper (12) and which acts between the brake caliper (12) and brake piston (16), having brake pads (22), and having a brake disk (24), the method having the following method steps:
   a) building up a hydraulic brake pressure, which acts on the brake piston (16), in a manner dependent on a braking command, and generating a clamping force between the brake disk (24) and the brake pads (22);
   b) holding the brake pressure in a manner dependent on the braking command;
   c) upon withdrawal of the braking command, reducing the hydraulic brake pressure acting on the brake piston (16) to a hydraulic intermediate pressure or an intermediate state of strain of at least one part of the hydraulic vehicle brake;
   d) holding the hydraulic intermediate pressure or the intermediate state of strain for a predefined second period of time; and
   e) reducing the hydraulic brake pressure.

2. The method according to claim 1, wherein, in step c), the hydraulic brake pressure is decreased within a predefined first period of time to the hydraulic intermediate pressure, and the clamping force between the brake disk (24) and the brake pads (22) is thus decreased, and/or in that, in step c), the hydraulic brake pressure is decreased in a manner dependent on a state of strain, detected by a sensor, of the at least one part of the hydraulic vehicle brake (10), until said at least one part has the intermediate state of strain, and the clamping force between the brake disk (24) and the brake pads (22) is thus decreased.

3. The method according to claim 2, wherein, in step c), the first period of time in which the hydraulic pressure is reduced to the hydraulic intermediate pressure lies in the interval from 1 second to 30 seconds.

4. The method according to claim 3, wherein, the first period of time in which the hydraulic pressure is reduced to the hydraulic intermediate pressure lies in the interval from 5 seconds to 20 seconds.

5. The method according to claim 1, wherein, in steps c) and d), the hydraulic intermediate pressure is selected such that the force exerted on the brake piston (20) by the intermediate pressure is greater than a resetting force which is present during step c) and d) and which is imparted to the brake piston (16) by the deformation of the brake piston seal (20) that is generated in step b).

6. The method according to claim 1, wherein, in steps c) and d), the hydraulic intermediate pressure is at least 1 bar and at most 3 bar.

7. The method according to claim 1, wherein, the intermediate state of strain is a state of strain of the brake caliper (12) and/or of the brake pads (22) and/or of the brake piston seal (20).

8. The method according to claim 1, wherein, before step c), the maximum and/or the average hydraulic brake pressure during a braking operation is detected, and steps c) to e) are carried out only if a minimum brake pressure is overshot by the maximum and/or the average hydraulic brake pressure during the braking operation, wherein the minimum brake pressure is at least 30 bar.

9. The method according to claim 8, wherein, the minimum brake pressure is at least 40 bar.

10. The method according to claim 1, wherein that step b) is associated with a deformation of the brake pads (22), of the brake caliper (12) and of the brake piston seal (20) in an original direction of movement of the brake piston (16), and in step c), the reduction is such that only a reversal of the deformation of the brake caliper (12) and of the brake pads (22) by at least 90% occurs, whilst the brake piston seal (20) continues to exhibit a deformed state in the direction of the original direction of movement of the brake piston (16) owing to the hydraulic intermediate pressure, and maintains the deformed state for as long as the intermediate pressure prevails.

11. The method according to claim 1, wherein, in step e), a reduction of the hydraulic brake pressure acting on the brake piston (16) takes place within a defined third period of time.

12. The method according to claim 11, wherein, within the third period of time, a hydraulic alternating pressure is built up and reduced, wherein a maximum magnitude of the alternating pressure is less than that of the hydraulic intermediate pressure.

13. The method according to claim 1, wherein that steps c) to e) are terminated if a new braking command is imparted or identified during the steps, and the method begins again with step a).

14. A vehicle brake system, which comprises at least one hydraulic vehicle brake (10), having a brake caliper (12), having a brake piston (16), having a brake piston seal (20) which is assigned to the brake caliper (12) and which acts between the brake caliper (12) and brake piston (16), having brake pads (22), and having a brake disk (24) and having a controller that is configured to carry out the method according to claim 1.

15. The method according to claim 1, wherein, the predefined second period of time is determined prior to a braking operation.

16. The method according to claim 1, wherein, the steps c) and d) are performed during service braking.

* * * * *